(12) United States Patent
Park et al.

(10) Patent No.: US 9,178,194 B2
(45) Date of Patent: Nov. 3, 2015

(54) BATTERY PACK HAVING A COVER WITH AT LEAST ONE CUT PORTION FORMED THEREIN

(75) Inventors: Kyungho Park, Yongin-si (KR); Seok Koh, Yongin-si (KR); Kyungwon Seo, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1164 days.

(21) Appl. No.: 12/183,364

(22) Filed: Jul. 31, 2008

(65) Prior Publication Data

US 2009/0111018 A1   Apr. 30, 2009

(30) Foreign Application Priority Data

Oct. 30, 2007   (KR) .......................... 10-2007-109725

(51) Int. Cl.
*H01M 2/02*   (2006.01)
*H01M 2/10*   (2006.01)

(52) U.S. Cl.
CPC .............. *H01M 2/1061* (2013.01); *H01M 2/02* (2013.01); *H01M 2/0207* (2013.01); *H01M 2/1016* (2013.01)

(58) Field of Classification Search
CPC ............................. H01M 2/02; H01M 2/1016
See application file for complete search history.

(56) References Cited

U.S. PATENT DOCUMENTS

| | | | | |
|---|---|---|---|---|
| 6,887,616 B2 * | 5/2005 | Kim et al. ........................ | 429/94 |
| 2002/0182480 A1 * | 12/2002 | Hanauer et al. ................ | 429/62 |
| 2003/0077486 A1 * | 4/2003 | Iwaizono et al. ................ | 429/7 |
| 2004/0029000 A1 | 2/2004 | Morita et al. | |
| 2004/0115527 A1 * | 6/2004 | Hiratsuka et al. ............. | 429/176 |
| 2005/0031952 A1 * | 2/2005 | Hayashi et al. ............... | 429/185 |
| 2005/0084749 A1 * | 4/2005 | Hwang et al. ................. | 429/127 |
| 2006/0032667 A1 * | 2/2006 | Sato .............................. | 174/260 |
| 2006/0166089 A1 * | 7/2006 | Suzuki et al. ................. | 429/185 |
| 2006/0199075 A1 * | 9/2006 | Moon et al. ................... | 429/176 |

(Continued)

FOREIGN PATENT DOCUMENTS

EP   1 648 043        4/2006
EP   1 717 882 A1   11/2006

(Continued)

OTHER PUBLICATIONS

European Examination Report dated Dec. 28, 2009 for European Patent Application No. EP 08 167 096.0 which shares priority of Korean Patent Application KR 10-2007-109725 with captioned U.S. Appl. No. 12/183,364.

(Continued)

*Primary Examiner* — Maria J Laios
(74) *Attorney, Agent, or Firm* — Knobbe Martens Olson & Bear LLP

(57) ABSTRACT

A battery pack to improve assembling reliability in a battery with a cover frame. The battery pack according to the present invention includes a rechargeable battery having at least one rounded lateral side; a cover frame including a frame surrounding each of lateral sides of the rechargeable battery, wherein more than at least one groove is formed at both ends of the frame covering the rounded lateral side of the rechargeable battery. Therefore, it is possible to couple the cover frame to the rechargeable battery via the groove without deforming the cover frame. Also, the rounded battery and the rounded cover frame closing each other is an effect that assembly error of a battery to cover frame can be reduced.

21 Claims, 6 Drawing Sheets

(56) References Cited

U.S. PATENT DOCUMENTS

| | | | |
|---|---|---|---|
| 2006/0244416 A1 | 11/2006 | Yong et al. | |
| 2006/0266542 A1* | 11/2006 | Yoon | 174/112 |
| 2007/0154799 A1* | 7/2007 | Yoon et al. | 429/176 |

FOREIGN PATENT DOCUMENTS

| | | |
|---|---|---|
| JP | 2004-063383 | 2/2004 |
| JP | 2004-273174 | 9/2004 |
| JP | 2005-100689 A | 4/2005 |
| JP | 2005-100696 | 4/2005 |
| JP | 2005-190891 | 7/2005 |
| JP | 2005-190956 A | 7/2005 |
| JP | 2005-327477 | 11/2005 |
| JP | 2006-164601 A | 6/2006 |
| KR | 10-2006-0105208 | 10/2006 |

OTHER PUBLICATIONS

Japanese Notice of Allowance dated Jul. 3, 2012 for Japanese Patent Application No. JP 2008-269200 which shares priority of Korean Patent Application No. KR 10-2007-0109725 with captioned U.S. Appl. No. 12/183,364.

* cited by examiner

BATTERY PACK HAVING A COVER WITH AT LEAST ONE CUT PORTION FORMED THEREIN

CROSS-REFERENCE TO RELATED APPLICATIONS

This application claims priority to and the benefit of Korean Patent Application No. 2007-109725 filed in the Korean Intellectual Property Office on Oct. 30, 2007, the disclosure of which is incorporated herein by reference.

BACKGROUND OF THE INVENTION

1. Field of the Invention

Aspects of the present invention relates to a secondary battery and, more particularly to a structure of a battery pack for coupling a secondary battery.

2. Description of the Related Art

Recently, compact, light-weight and portable electronic devices, such as cellular phones, notebook computers, camcorders, and the like, are being developed and produced briskly. These portable electronic devices include a battery pack so that the devices can be operated even where additional power sources are not provided. Currently, the battery pack employs a secondary battery in which charging/discharging can be executed when taking the economic aspects into consideration. A Ni—Cd battery, a Ni-MH battery, a Li battery and a Li-ion secondary battery are examples of typical secondary batteries. The operation voltage of the Li-ion secondary battery is approximately three times higher than those of the Ni—Cd battery and the Ni-MH battery, which are widely used as the power sources of the portable electronic devices. In addition, Li-ion secondary batteries are widely used since the energy density per unit weight for Li-ion secondary batteries is very high.

The secondary battery usually employs a Li-based oxide as positive electrode active material and a carbonic material as negative electrode active material. Generally, the secondary battery is classified into a liquid electrolyte battery and a high-polymer electrolyte battery according to the kind of electrolyte. A battery using the liquid electrolyte is called a lithium ion battery, and a battery using the high-polymer electrolyte is called a lithium polymer battery. A lithium secondary battery is formed in various kinds of shapes, such as a cylindrical shape, a square shape, and a pouch shape.

Among the secondary batteries having these shapes, the edges of the secondary battery in a square shape may be crushed due to shocks during assembly and/or use. In order to prevent this problem, the secondary battery may be used after coupling a cover frame to a battery that covers the edges of the secondary battery.

The secondary battery has a rounded lateral side surface, and thus assembling the secondary battery with the cover frame is difficult due to the lateral rounded side surface. The assembly workers push the battery into the cover frame, and as a result, the cover frame is deformed inelastically. Moreover, because the cover frame does not return to the first shape due to the deformation, reassembling the secondary battery with the cover frame is difficult.

Also, a rounded side surface of the secondary battery with which the cover frame is in contact is depressed, affecting assembling reliability of the cover frame.

SUMMARY OF THE INVENTION

Aspects of the present invention provide a battery pack having a cover frame coupled to a battery without generating a plastic deformation of the cover frame.

According to an aspect of the present invention, a battery pack is provided. The battery pack includes a rechargeable battery having at least one rounded lateral side; a cover frame including sides surrounding each lateral side of the rechargeable battery, wherein at least one groove is formed at both ends of the side that covers the rounded lateral side of the rechargeable battery. According to another aspect of the invention, one side of the cover frame that is in contact with the rounded lateral side of the rechargeable battery is a rounded side to surround the rounded lateral side.

According to another aspect of the present invention, a battery pack is provided. The battery pack includes a rechargeable battery having at least one rounded lateral side; and a cover frame including sides surrounding each of the lateral sides of the rechargeable battery, wherein one side of the cover frame that is in contact with the rounded lateral side of the rechargeable battery is a rounded side surrounding the rounded lateral side. According to another aspect of the present invention, at least one groove is formed at both ends of the side covering the rounded lateral side of the rechargeable battery.

According to another aspect of the present invention, the rechargeable battery is a square shape as seen from a front of a wide side of the rechargeable, and the cover frame is formed in a square shape for surrounding a narrow lateral side of the rechargeable battery.

According to another aspect of the present invention, the groove is formed in a square shape or an arc shape.

According to another aspect of the present invention, the cover frame is formed by a thermoplastic resin.

According to another aspect of the present invention, a hole for a charging/discharging terminal is formed in a side of the cover frame.

According to another aspect of the present invention, the battery pack includes a protection circuit board arranged between one of the sides of the cover frame and the battery, on which a charging/discharging terminal is formed, wherein a hole to accommodate the charging/discharging terminal is formed in a frame of the cover frame.

According to another aspect of the present invention, an insulator to insulate the protection circuit board is arranged between the protection circuit board and the rechargeable battery.

According to another aspect of the present invention, a mount case to mount the protection circuit board is arranged between the protection circuit board and the rechargeable battery.

According to another aspect of the present invention, the battery pack includes a label surrounding a region in which the side having the groove is in contact with the rechargeable battery.

According to another aspect of the present invention, the rechargeable battery is a can type rechargeable battery.

According to another aspect of the present invention, the rechargeable battery is a pouch type rechargeable battery.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
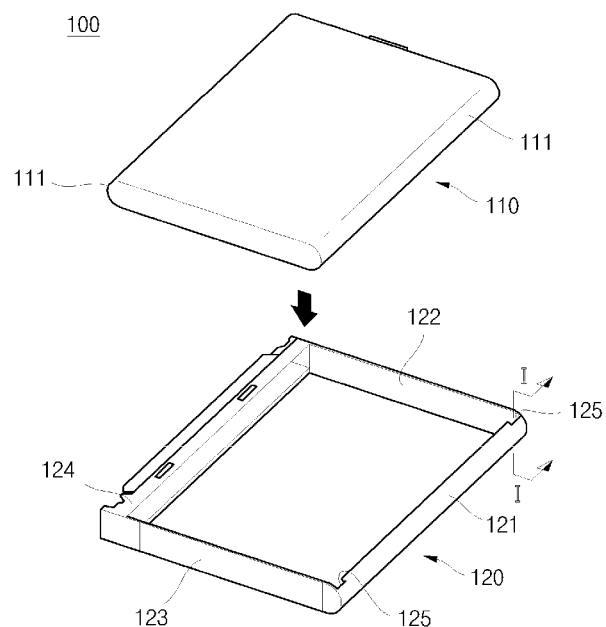
FIG. 1A is an exploded perspective view illustrating a battery pack according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1A is an exploded perspective view illustrating a battery pack 100 according to an embodiment of the present invention. The battery pack 100 includes a battery 110 and a cover frame 120. According to other aspects of the present invention, the battery pack may include additional components.

The battery 110 is formed of at least one round surface 111 among several lateral sides. The battery 110 may be formed with two wide surfaces facing each other and three narrow surface connecting the two wide surfaces. In this case, at least two of the narrow surfaces are the respective round surfaces 111.

The cover frame 120 includes a frame surrounding each of the lateral sides of the battery 110. More than one groove 125 may be formed at both ends of the frame covering the lateral side of the battery 110 on which a round surface 111 is formed. The cover frame 120 surrounds the lateral sides of the battery 110, and surrounds the battery 110 in order to protect the battery 110 from external shocks.

The cover frame 120 may be coupled to several batteries at once since each side 121, 122, 123, 124 of the cover frame surrounding the batteries are integrally formed. In this case, the groove 125 in a square shape or an arc shape may be formed at both ends of the frame that is in contact with the rounded lateral sides 111 of the battery 110. The groove 125 prevents both ends of the frame in contact with the rounded lateral side 111 of the battery 110 from being plastic-deformed when the battery 110 is inserted into the cover frame 120.

Figure 1B:
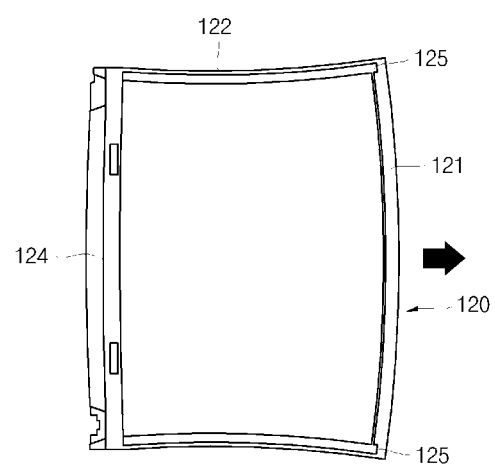
FIG. 1B is a plane view illustrating a state that a cover frame is pulled into one direction for coupling a battery to the cover frame of FIG. 1A.

FIG. 1B is a plane view of a state that a cover frame is pulled into one direction for coupling the battery 110 to the cover frame 120 shown in FIG. 1a. The battery 110 is coupled to the cover frame 120 while the side 121 in contact with a rounded lateral side of a battery (not shown) is opened in a direction indicated by the arrow. If the groove 125 is not formed, a plastic deformation may be generated at both ends of the side 121 when the side 121 is stretched, thereby generating an assembling error between the cover frame 120 and the battery. By forming the groove 125, the cover frame 120 is not deformed inelastically and the cover frame 120 can be returned to its original shape.

Figure 1C:
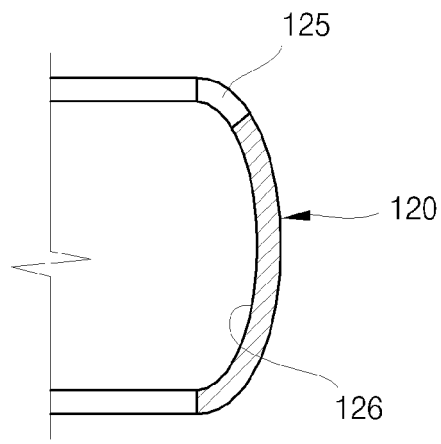
FIG. 1C is a cross-sectional view taken along I-I line of FIG. 1A.

FIG. 1C is a cross-sectional view taken along I-I line of FIG. 1a. One side 126 of the cover frame 120 covering a rounded lateral side of a battery (not shown) may be rounded so as to surround the rounded lateral side. When the rounded lateral side of the battery 110 and the cover frame 120 are coupled, a rounded lateral side of the cover frame 120 may cover the rounded lateral side of a battery in order to minimize the gap between the battery 110 and the cover frame 120. Thus, the assembling force of the battery (not shown) and cover frame 120 can be improved. Also, assembling error of the battery and the cover frame 120 can be reduced.

Figure 1D:
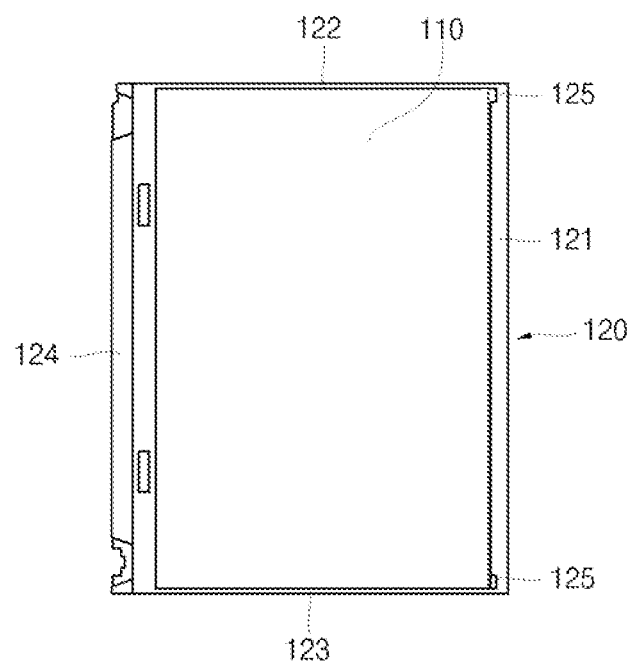
FIG. 1D is a plane view illustrating battery coupled to a cover frame of FIG. 1A.

FIG. 1D is a plane view showing the battery 110 coupled to the cover frame 120. The battery 110 is a square shape as seen from the front of a wide side of the battery 110. The cover frame 120 may be formed in a square shape surrounding narrow lateral sides of the battery. As the size of the portable electronic devices is getting smaller and thinner, the thickness of the battery mounted in the portable electronic devices is getting thinner and is being widely used in a square shape in which excellent insertion is realized. However, in terms of the structure, there exists a problem that the edges of the battery 110 having such a structure are crushed flat due to the external shock or force of insertion. The edges of the battery 110 may be protected by surrounding the narrow lateral side of the battery 110 using the cover frame 120 in order to solve this shortcoming. The cover frame 120 is also formed in a square shape surrounding the narrow lateral side of the battery 110.

The cover frame 120 may be formed of a thermoplastic resin. The cover frame 120 may be formed by an injection molding. The cover frame 120 may be formed by converting the original material into a thermoplastic resin having an elastic force and a restoring force. Among the thermoplastic resins, materials having excellent elasticity and anti-shock property, such as a polyethylene or an ABS resin that is not inflammable, may be employed.

Figure 2:
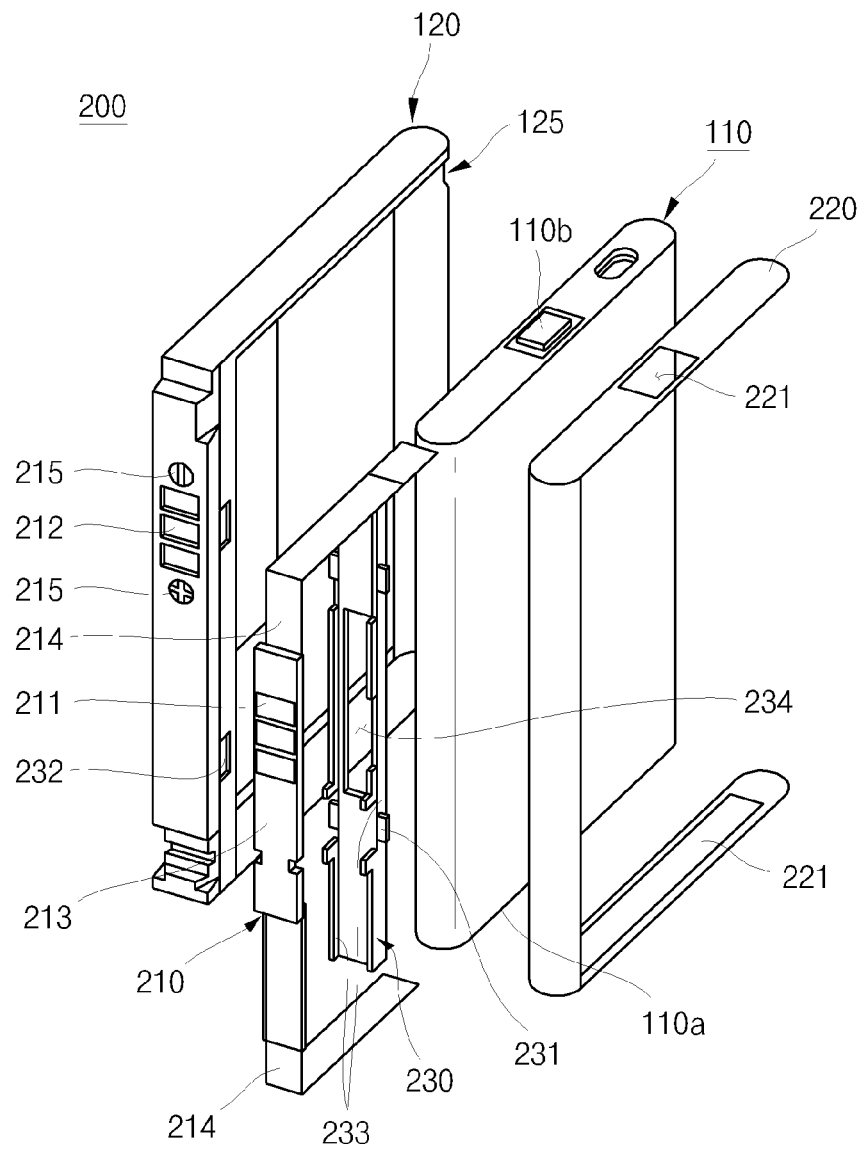
FIG. 2 is an exploded perspective view illustrating a battery, a cover frame, and a coupling auxiliary according to another embodiment of the present invention.

FIG. 2 is an exploded perspective view of a battery pack 200, including the battery 110, the cover frame 120, and a coupling auxiliary (insulating body) 220, according to another embodiment of the present invention. As shown in FIG. 2, a protection circuit board 210 is electrically coupled with a positive electrode 110a and a negative electrode 110b of the battery 110. The protection circuit board 210 may be formed with a charging/discharging terminal 211. In this case, a hole 212 for the charging/discharging terminal 211 is formed in one of the frames of the cover frame 120. The hole 212 exposes a terminal side of the charging/discharging terminal 211 of the protection circuit board 210 to the outside. The charging/discharging terminal 211 is coupled to a load or a charging device, thereby charging/discharging the battery pack 200. The protection circuit board 210 contains electrical elements including passive elements (not shown), active elements (not shown), and a protection circuit (not shown). These electrical elements may be welded to a print circuit pattern (not shown) formed on the upper side and the lower side of an insulating substrate 213.

The protection circuit board 210 may be electrically coupled to a positive electrode and a negative electrode of the battery 110 by a positive/negative lead tab 214. A protection circuit of the protection circuit board 210 electrically coupled to the battery 110 is electrically coupled to the active elements and the passive elements to control all kinds of states of the battery 110 and to check the remaining charge of the battery 110. Charging or discharging may be controlled by selecting a suitable charging method according to the charging/discharging state of a secondary battery. The protection circuit stores information about the battery 110, such as a voltage, a current, a temperature, a remaining charge, and the like, and transmits the information to external devices. The protection circuit may be an integrated circuit in which a plurality of logic elements and active/passive elements are integrated.

A positive/negative display groove 215 may be formed around the hole 212 formed in the cover frame 120. The positive/negative display groove 215 displays a positive electrode and a negative electrode of the charging/discharging terminal 211 so that polarity information of a battery pack may be notified to a user.

An insulating body 220 for insulating the protection circuit board 210 may be formed between the protection circuit board 210 and the battery 110. The insulating body 220 insulates the protection circuit board 210 and the battery 110 to prevent a short between the protection circuit board 210 and the battery 110. The insulating body 220 may be formed of resins, such as polypropylene or polyethylene or the like. However, the present invention is not limited thereto; the insulating body 120 may be composed of any insulating material. The insulating body 220 may be formed in a variety of shapes according to a lateral shape of the battery 110.

A positive/negative coupling hole 221 may be formed in the insulating body 220 to couple the protection circuit board 210 to the positive electrode and the negative electrode of the battery 110. A positive/negative lead tab 214 electrically coupled to the protection circuit board 210 may be electrically coupled to the positive electrode 110a and negative electrode 110b via the positive/negative coupling hole 221.

A mounting case 230 for mounting the protection circuit board 210 may be formed between the protection circuit board 230 and the battery 110. The mounting case 230 forms a protrusion 231 so that the mounting case 230 may be hooked to a hook hole 232 formed in the cover frame 120. Here, the cover frame 120 and the protection circuit board 210 are coupled integrally by mounting the protection circuit board 210. In particular, the mounting case 230 supports the protection circuit board 210 so that a terminal side of the charging/discharging terminal 211 formed in the protection circuit board 210 is coupled to the hole 212 for charging/discharging terminal formed in the cover frame 120 correctly. In the mounting case 230, lateral walls 233 are formed for mounting the protection circuit board 210, and a hole 234 may be formed for securing a space on which the electrical elements mounted in the protection circuit board 210 are positioned.

Figure 3:
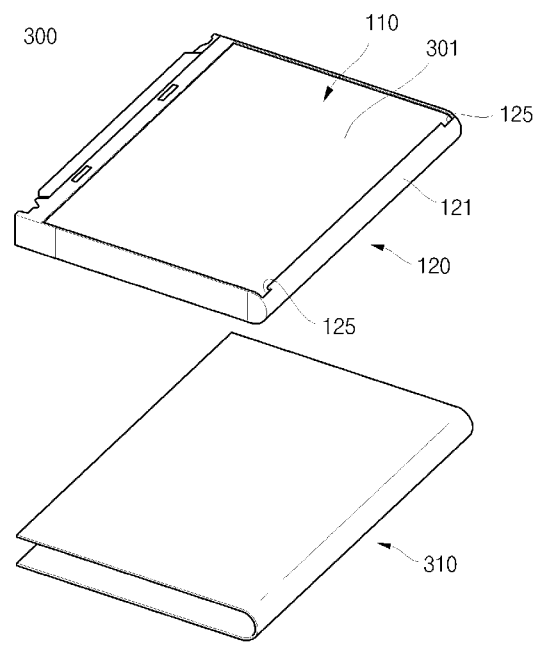
FIG. 3 is an exploded perspective view illustrating a battery pack according to still another embodiment of the present invention.

FIG. 3 is an exploded perspective view showing a battery pack 300 according to still another embodiment of the present invention. The battery pack 300 includes a battery 110, a cover frame 120 and a label 310.

The label 310 adheres the rounded side 121 formed by the groove 125 to the wide surface 301 of the battery 110. As a result, a coupling force between the battery 110 and cover frame 120 is improved by the label 310. The adhesive may be polypropylene or polyethylene so that the battery and the cover frame may be coupled. However, the present invention does not limit the materials and the structure of the label 310.

Figure 4A:
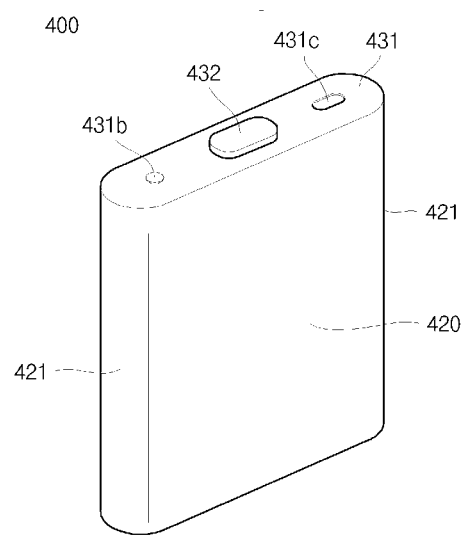
FIG. 4A is a perspective view illustrating a can type rechargeable battery according to still another embodiment of the present invention.
Figure 4B:
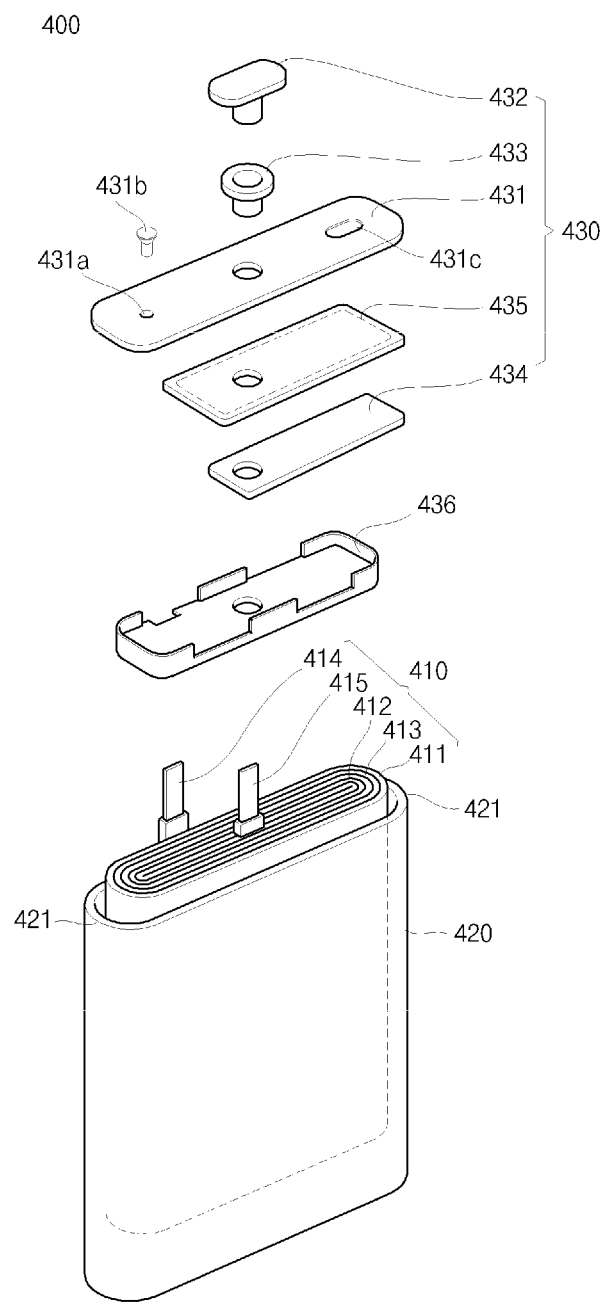
FIG. 4B is an exploded perspective view illustrating the can type rechargeable battery of FIG. 4A.

FIG. 4A is a perspective view showing a can type rechargeable battery 400 according to still another embodiment of the present invention. FIG. 4B is an exploded perspective view showing the can type rechargeable battery 400.

Referring to FIG. 4A, a battery 400 using the battery pack is formed as a can type rechargeable battery. The can type rechargeable battery 400 may be recharged and formed with at least one rounded lateral side formed.

The can type rechargeable battery 400 may include an electrode assembly 410, a can 420, and a cap assembly 430. The electrode assembly 410 may be formed by stacking a positive electrode plate 411 to which a positive electrode tab 415 is coupled, a negative electrode plate 412 to which a negative electrode tab 415 is coupled, and a separator 413, and then winding the positive electrode plate 411, the separator 413, and the negative electrode plate 412.

The positive electrode plate 411 includes a positive electrode collector and a positive electrode coating portion. The positive electrode coating portion may be composed of a layered compound containing a lithium compound, a binder for improving a bonding strength, and a conductive material for improving conductivity. Generally, aluminum is used as the positive electrode collector; however, other materials may be used as well. The positive electrode collector is used as a path through which charges generated in the positive electrode coating portion move, and supports the positive electrode coating portion. The positive electrode coating portion is attached over the wide sides of the positive electrode collector. A positive electrode non-coating portion (not shown) on which the positive electrode coating portion is not formed is formed on a lateral side of the positive electrode plate 411. The positive electrode tab 414 is coupled to the positive electrode non-coating portion.

The negative electrode plate 412 includes a negative electrode collector and a negative electrode coating portion. The negative electrode coating portion may be composed of hard carbon or graphite containing carbon and a binder for improving bonding strength between active material particles. In general, the negative electrode collector is formed of copper, and serves as a passage for an electric charge generated from the negative electrode coating portion, though other materials may be used as well. The negative electrode collector supports the negative electrode coating portion. The negative electrode coating portion is formed on a wide surface of the negative electrode plate. A negative electrode non-coating portion (not shown), in which the negative electrode coating portion is not formed, is formed at one end of the negative electrode plate 412. The negative electrode tab 415 is connected to the negative electrode non-coating portion.

The separator 413 interposed between the positive electrode plate 411 and the negative electrode plate 412 insulates the positive electrode plate 411 from the negative electrode plate 412, but transmits charges of the positive electrode plate 411 and the negative electrode plate 412. The separator is generally formed of polyethylene (PE) or polypropylene (PP), but other materials may be used as well. When the separator 413 is a separator for a lithium-polymer battery, air holes may be formed in the separator 413, and thus the separator 413 may include the air holes and the polymer electrolyte.

The can 420 has one end side open to accommodate the electrode assembly 410. The can 420 may be formed in a square shape or an elliptic shape, based on the shape of the electrode assembly 410. The can 420 accommodates an insulating case 436 on the upper side of the electrode assembly 410. The insulating case 436 is coupled to the can 420 by covering a cap plate 431 on an opening of the can 420, and then welding the insulating case 436 to the can 420. Generally, aluminum is used as the material of the can 420, though other materials may be used as well. A lateral side 421 of the can 420 may be round. The can 420 may be formed with two wide surfaces facing each other and three narrow surface connecting the two wide surfaces. In this case, at least two of the narrow surfaces are respective rounded surfaces 421.

The cap assembly 430 includes a cap plate 431, an electrode terminal 432, an insulating gasket 433, the insulating case 436, a terminal plate 434, and an insulating plate 435. The cap plate 431 covers the opening of the can 420, and includes an electrolyte injection hole lid 431a formed on the upper side thereof to seal an electrolyte injection hole 431a, a safety vent 431c to open the can so as to prevent an explosion, and is thus electrically coupled to the positive electrode tab 414. The electrode terminal 432 is mounted in a middle hole of the cap plate 431 and electrically coupled to the negative electrode tab 415. The insulating gasket 433 insulates the electrode terminal 432 and the cap plate 431 by surrounding a body of the electrode terminal 432. The insulating case 436 includes a hole to project the positive electrode tab 414 and the negative electrode tab 415, and is mounted on the upper side of the electrode assembly 410 to insulate the upper surface of the electrode assembly 410. The terminal plate 434 provides a hole to allow an end of the electrode terminal 432 to be pressed and then fixed. The insulating plate 435 insulates the terminal plate 434 and the cap plate 431.

The insulating gasket 433, the insulating case 436, and the insulating plate 435 may be formed of insulating materials, such as polyethylene resin or polypropylene resin or the like. The electrode terminal 432, the cap plate 431, and the terminal plate 434 may be formed of conductive metals, such as aluminum or nickel, or an alloy including a conductive metal and so on. However, any materials or structure of the cap assembly 430 may be employed.

Figure 5A:
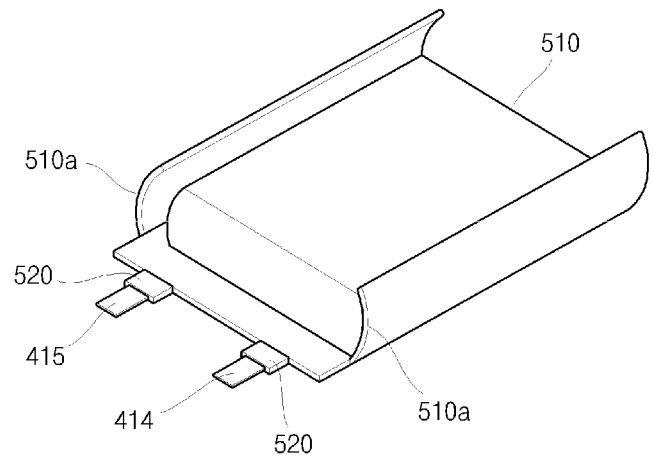
FIG. 5A is an perspective view illustrating a pouch type rechargeable battery according to still another embodiment of the present invention.
Figure 5B:
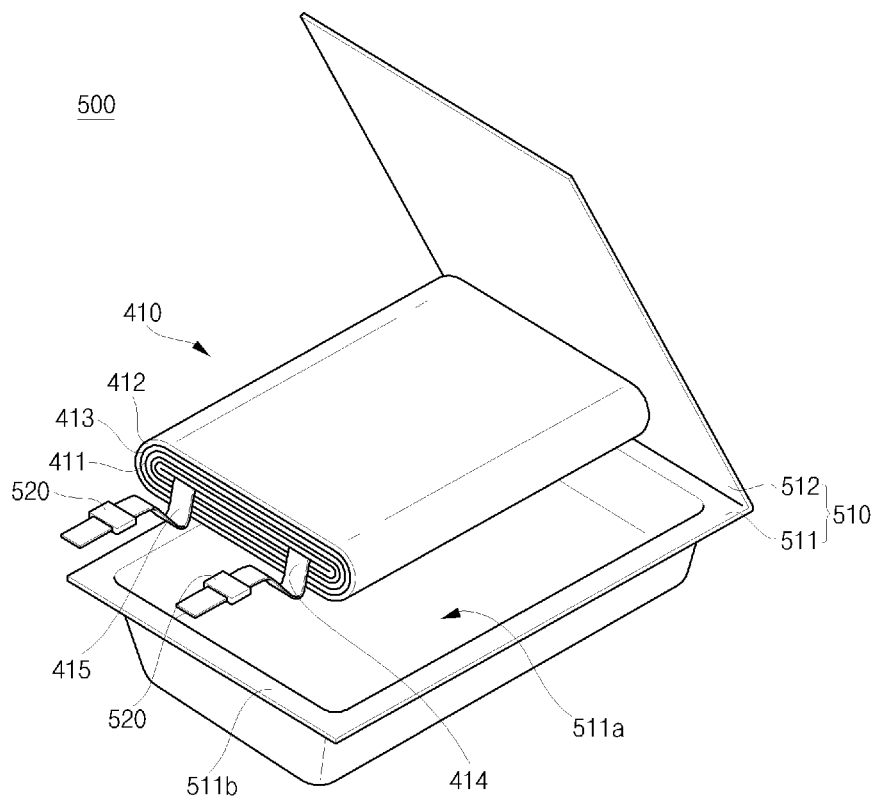
FIG. 5B is an exploded perspective view illustrating the pouch type rechargeable battery of FIG. 5A.

FIG. 5A is a perspective view illustrating a pouch type rechargeable battery 500 according to still another embodiment of the present invention. FIG. 5B is an exploded perspective view illustrating the pouch type rechargeable battery 500.

As shown in FIG. 5A, a battery using the battery pack of the present invention may be formed as the pouch type rechargeable battery 500. The pouch type rechargeable battery 500 may be recharged, and at least one lateral side of the pouch type rechargeable battery 500 may be rounded.

As shown in FIG. 5B, the pouch type rechargeable battery 500 includes a electrode assembly 410 and a pouch 510. The electrode assembly 410 may be an electrode assembly used for the can type rechargeable battery 400. The separator 413 used may contain a polymer electrolyte. The electrode assembly 410 used for the pouch type rechargeable battery 400 may be an electrode assembly for a lithium polymer battery.

The pouch 510 accommodates the electrode assembly 410 with the positive electrode tab 414 and the negative electrode tab 415 exposed therefrom. The pouch 510 may be formed of a multi-layer film. In the multi-layer film, a thermal adhesive layer (not shown), which is an inner layer, may be formed of CPP (casted polypropylene), an intermediate barrier layer (not shown) may be formed of an aluminum layer, and an outer protection layer (not shown) may be formed of a nylon layer. The pouch 510 may include a lower film 511 having a groove 511a to accommodate the electrode assembly 410 formed therein and an upper film 512 to seal an opening of the lower film 511. The lower film 511 and the upper film 512 are bonded to each other by heating the thermal adhesive layer, which is a contact portion between the lower film 511 and the upper film 512. A positive electrode/negative electrode insulating tape 520 interposed between the lower film 511 and the upper film 512 may be attached to the pouch 510 by applying heat. However, the structure of the pouch and materials forming the pouch are not limited to the above. After the pouch 510 accommodates the electrode assembly 410, the pouch 510 folds an external sealing region, and the external sealing region may be a round region. As shown in FIG. 5A, the sealing portion of the external sealing region folded of FIG. 5A is a rounded portion 510a.

As the battery pack according to aspects of the present invention includes a groove in a cover frame for restoring the cover frame to a former state, the battery back is easily assembled without damage. Also, the battery pack according to aspects of the present invention is formed with a rounding in a cover frame in which a rounded surface of a battery is assembled, thus improving reliability in assembling a battery with a cover frame.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack comprising:
   a rechargeable battery having a rounded lateral side; and
   a cover comprising:
      a first frame having opposing ends;
      a second frame and a third frame crossing the first frame and connected to the opposing ends of the first frame; and
      a rounded fourth frame connecting the second frame to the third frame,
      wherein the rounded fourth frame corresponds to and is configured to surround the rounded lateral side of the rechargeable battery,
      wherein the rechargeable battery is configured to be inserted into the cover and removed from the cover, and
      wherein the rounded fourth frame is flexible and has cut portions formed at opposing ends thereof, respectively, so as to enable the rounded fourth frame to outwardly expand when the rechargeable battery is being inserted into the cover or being removed from the cover.

2. The battery pack according to claim 1, wherein the rounded fourth frame contacts the rounded lateral side of the rechargeable battery.

3. The battery pack according to claim 1, wherein the rechargeable battery is a square shape as seen from a front of a wide side of the rechargeable battery, and wherein the cover is formed in a square shape surrounding a narrow lateral side of the rechargeable battery.

4. The battery pack according to claim 1, wherein the cover is formed of thermoplastic resin.

5. The battery pack according to claim 1, further comprising a protection circuit board arranged between the cover and the battery, on which a charging/discharging terminal is formed; and
   wherein a hole to accommodate the charging/discharging terminal is formed in any one of the frames of the cover.

6. The battery pack according to claim 5, further comprising an insulator to insulate the protection circuit board arranged between the protection circuit board and the rechargeable battery.

7. The battery pack according to claim 5, further comprising a mount case to mount the protection circuit board and arranged between the protection circuit board and the rechargeable battery.

8. The battery pack according to claim 1, further comprising a label surrounding a region in which the rounded fourth frame contacts the rechargeable battery.

9. The battery pack according to claim 1, wherein the rechargeable battery comprises:
an electrode assembly;
a can to accommodate the electrode assembly via an opening and having at least one rounded side; and
a cap assembly to cover the opening of the can.

10. The battery pack according to claim 1, wherein the rechargeable battery comprises:
an electrode assembly; and
a pouch to accommodate the electrode assembly by sealing and having at least one rounded side.

11. The battery pack according to claim 1, wherein the second and third frames are flexible so as to inwardly contract when the rounded fourth frame expands.

12. A battery pack comprising:
a rechargeable battery having a rounded lateral side; and
a cover comprising:
a first frame having opposing ends;
a second frame and a third frame crossing the first frame and connected to the opposing ends of the first frame; and
a rounded fourth frame connecting the second frame to the third frame,
wherein the rounded fourth frame corresponds to and is configured to surround and contact the rounded lateral side of the rechargeable battery,
wherein the rechargeable battery is configured to be inserted into the cover and removed from the cover, and
wherein the rounded fourth frame is flexible and has cut portions formed at opposing ends thereof, respectively, so as to enable the rounded fourth frame to outwardly expand when the rechargeable battery is being inserted into the cover or being removed from the cover.

13. The battery pack according to claim 12, wherein:
the rechargeable battery has a square shape as seen from a front of a wide side of the rechargeable battery; and
the cover frame is formed in a square shape surrounding a narrow lateral side of the rechargeable battery.

14. The battery pack according to claim 12, wherein the cover is formed of thermoplastic resin.

15. The battery pack according to claim 12, further comprising a protection circuit board arranged between the cover and the battery, on which a charging/discharging terminal is formed; and
wherein a hole to accommodate the charging/discharging terminal is formed in one of the frames of the cover.

16. The battery pack according to claim 15, further comprising an insulator to insulate the protection circuit board arranged between the protection circuit board and the rechargeable battery.

17. The battery pack according to claim 15, further comprising a mount case to mount the protection circuit board and arranged between the protection circuit board and the rechargeable battery.

18. The battery pack according to claim 12, further comprising a label surrounding a region in which the rounded fourth frame contacts the rechargeable battery.

19. The battery pack according to claim 12, wherein the rechargeable battery comprises:
an electrode assembly;
a can to accommodate the electrode assembly via an opening and having at least one rounded side; and
a cap assembly to cover the opening of the can.

20. The battery pack according to claim 12, wherein the rechargeable battery comprises:
an electrode assembly; and
a pouch to accommodate the electrode assembly by sealing and having at least one rounded side.

21. A battery pack comprising:
a rechargeable battery having a rounded side;
a cover coupled to the rechargeable battery comprising:
a first frame having opposing ends;
a second frame and a third frame crossing the first frame and connected to the opposing ends of the first frame; and
a rounded fourth frame connecting the second frame to the third frame,
wherein the rounded fourth frame corresponds to and is configured to surround the rounded side of the rechargeable battery,
wherein the rechargeable battery is configured to be inserted into the cover and removed from the cover,
wherein the rounded fourth frame is flexible and has cut portions formed at opposing ends thereof, respectively, so as to enable the rounded fourth frame to outwardly expand when the rechargeable battery is being inserted into the cover or being removed from the cover; and
an adhesive label surrounding the rounded fourth frame to adhere the cover to the rechargeable battery.

* * * * *

UNITED STATES PATENT AND TRADEMARK OFFICE
CERTIFICATE OF CORRECTION

PATENT NO. : 9,178,194 B2  
APPLICATION NO. : 12/183364  
DATED : November 3, 2015  
INVENTOR(S) : Kyungho Park et al.

Page 1 of 1

It is certified that error appears in the above-identified patent and that said Letters Patent is hereby corrected as shown below:

In the claims

In column 9 at line 41, In Claim 13, change "cover frame" to --cover--.

Signed and Sealed this  
Ninth Day of August, 2016

Michelle K. Lee  
*Director of the United States Patent and Trademark Office*